(12) United States Patent
Zhang

(10) Patent No.: US 11,333,061 B1
(45) Date of Patent: May 17, 2022

(54) METHODS AND SYSTEMS FOR PRECHAMBER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/201,622

(22) Filed: Mar. 15, 2021

(51) Int. Cl.
   *F02B 19/10* (2006.01)
   *F02B 33/40* (2006.01)
   *F02B 21/00* (2006.01)
   *F02B 47/08* (2006.01)

(52) U.S. Cl.
   CPC ............. *F02B 19/10* (2013.01); *F02B 21/00* (2013.01); *F02B 33/40* (2013.01); *F02B 47/08* (2013.01)

(58) Field of Classification Search
   CPC .......... F02B 19/10; F02B 21/00; F02B 47/08; F02B 33/40
   USPC ................................ 123/260, 261, 275, 559.1
   See application file for complete search history.

(56) References Cited

U.S. PATENT DOCUMENTS

| | | | |
|---|---|---|---|
| 9,995,202 | B2 | 6/2018 | Willi et al. |
| 10,337,397 | B2 | 7/2019 | Shelby et al. |
| 10,364,738 | B2 | 7/2019 | VanDerWege |
| 2020/0158005 | A1 | 5/2020 | Singh et al. |
| 2020/0200068 | A1* | 6/2020 | Schock ............... F02B 21/02 |

FOREIGN PATENT DOCUMENTS

KR  101862281 B1  7/2018

* cited by examiner

*Primary Examiner* — Hai H Huynh
(74) *Attorney, Agent, or Firm* — Geoffrey Brumbaugh; McCoy Russell LLP

(57) ABSTRACT

Methods and systems are provided for a prechamber. In one example, a system comprises a reservoir fluidly coupled to a prechamber and a compressor. The reservoir is configured to store boost air or residual gases.

20 Claims, 8 Drawing Sheets

METHODS AND SYSTEMS FOR PRECHAMBER

FIELD

The present description relates generally to a prechamber of an engine.

BACKGROUND/SUMMARY

Engines have in the past utilized prechamber combustion to increase combustion efficiency and correspondingly reduce emissions. Prechamber combustion systems may include an auxiliary prechamber above or within the main combustion chamber with an ignition device and fuel injector coupled to the auxiliary prechamber. In such systems, combustion unfolds in the following sequence; (i) a small amount of fuel is directly injected into the prechamber, (ii) spark is provided to the air/fuel mixture in the prechamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ prechamber schemes.

In some prechambers, issues may arise from residual gases from a previous combustion cycle being present in an interior volume of the prechamber. The residual gases may block an air/fuel mixture from within the combustion chamber to flow into the prechamber, and thus, may not be exposed to an ignition device arranged therein. One approach to solve this issue is to include an auxiliary air pump configured to clear the residual gases prior to combustion.

However, the inventors have identified some issues with the approaches described above. For example, the auxiliary air pump increases a packaging size of the prechamber while also further complicating routines thereof. Additionally, cold-start emissions associated with unburned fuel may not be reduced.

In one example, the issues described above may be addressed by a system for a reservoir fluidly coupled to each of a compressor and a prechamber. In this way, unburned fuel from a cold-start may be stored in the reservoir and mixed with boost air during future combustion conditions.

As one example, a valve may be configured to adjust a direction a gas flows between the reservoir and the prechamber. The valve may be opened during some conditions of a cold-start to flow exhaust gases comprising a high amount of unburned fuel into the reservoir. The valve may also be opened during other conditions to flow boost air from the compressor to the prechamber to clear residual gases and enhance air/fuel mixing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
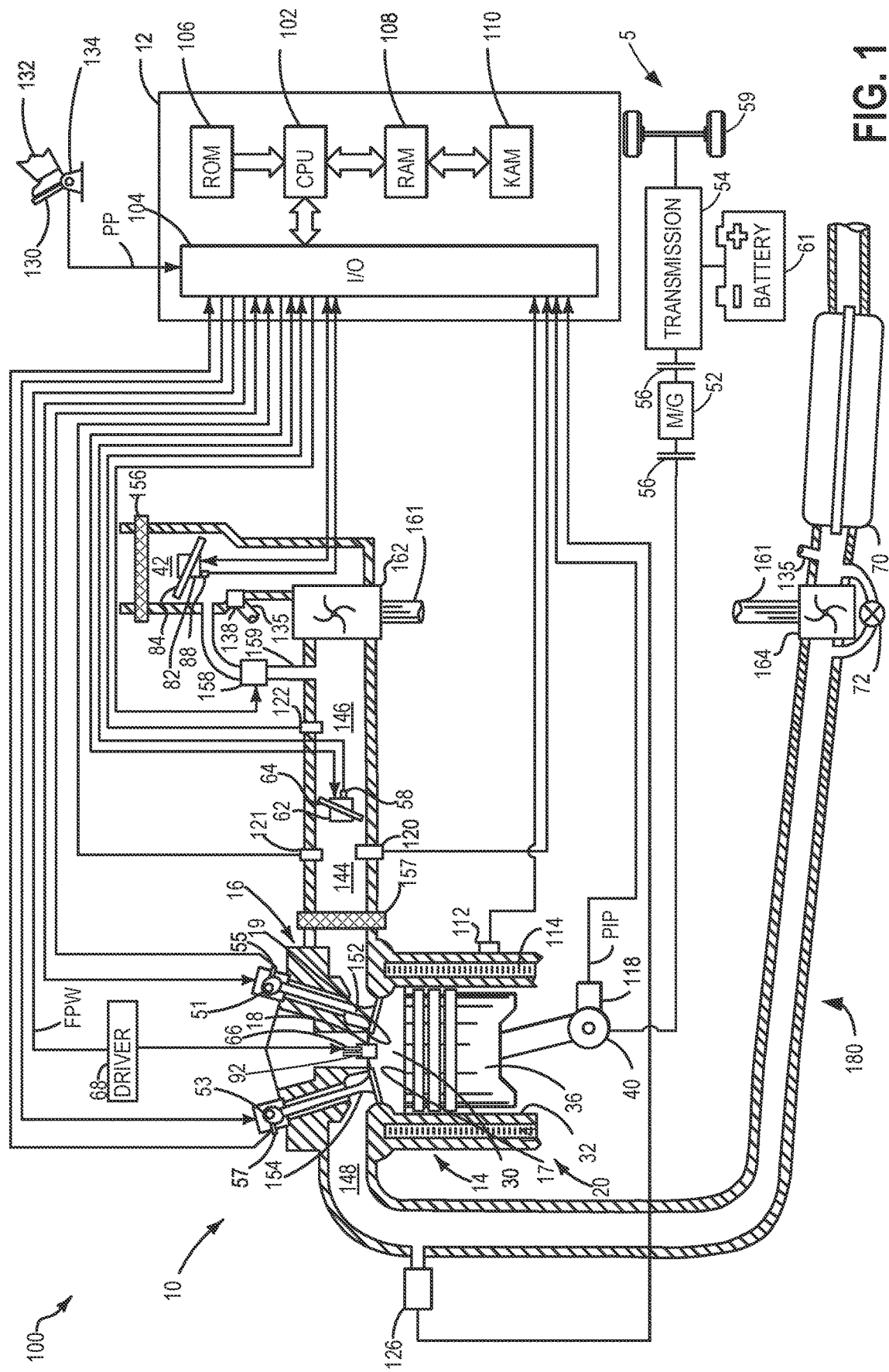
FIG. 1 illustrates a schematic of an engine included in a hybrid vehicle.
Figure 2:
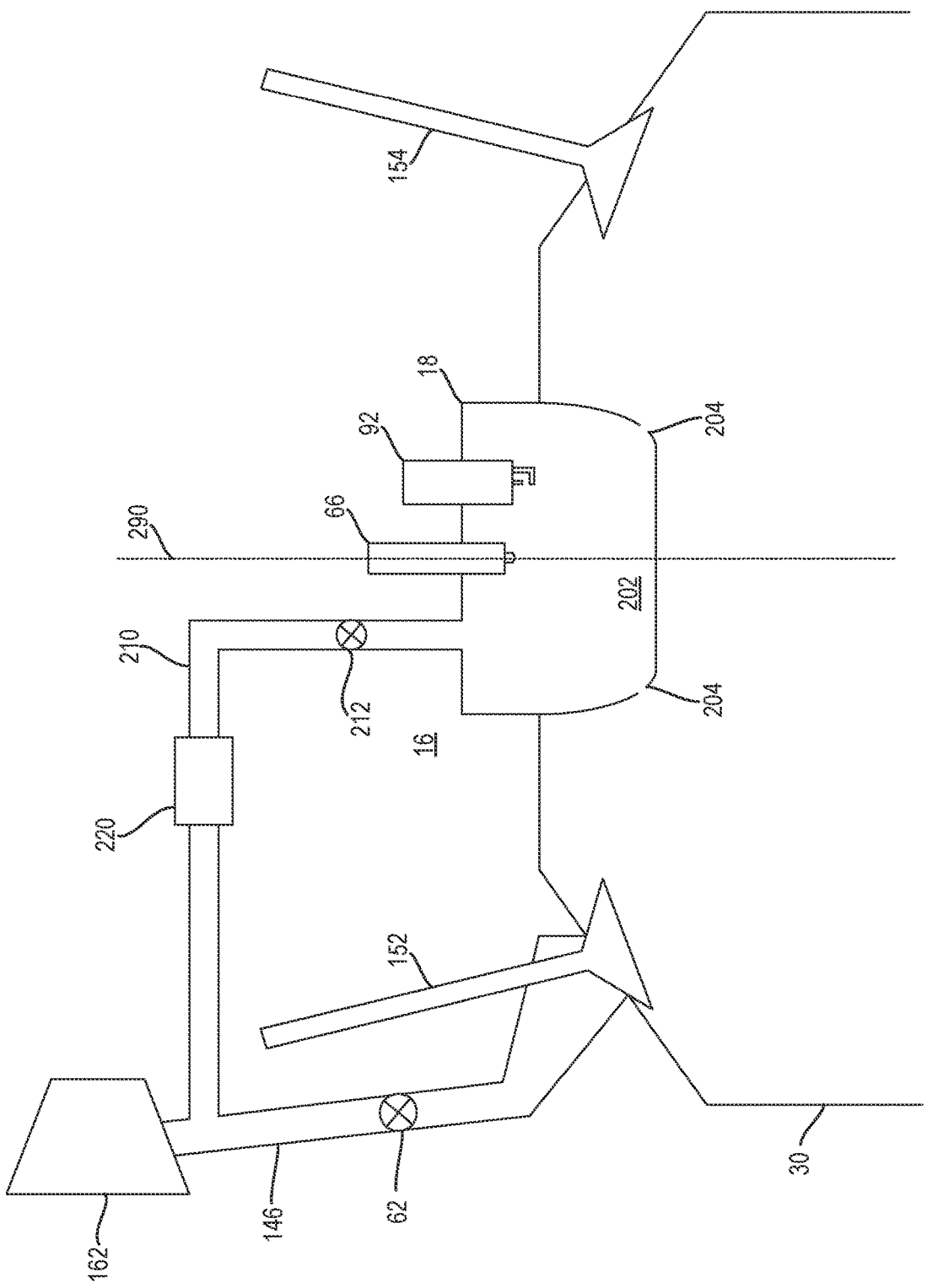
FIG. 2 illustrates a detailed schematic of a prechamber of the engine fluidly coupled to a reservoir.

The following description relates to systems and methods for a prechamber. The prechamber may be arranged in a combustion chamber of an engine, as illustrated in the example of FIG. 1. The prechamber may house a fuel injector and an ignition device. An interior volume of the prechamber may be fluidly coupled to a reservoir. The reservoir may be further fluidly coupled to a compressor, as illustrated in FIG. 2.

Figure 3A:
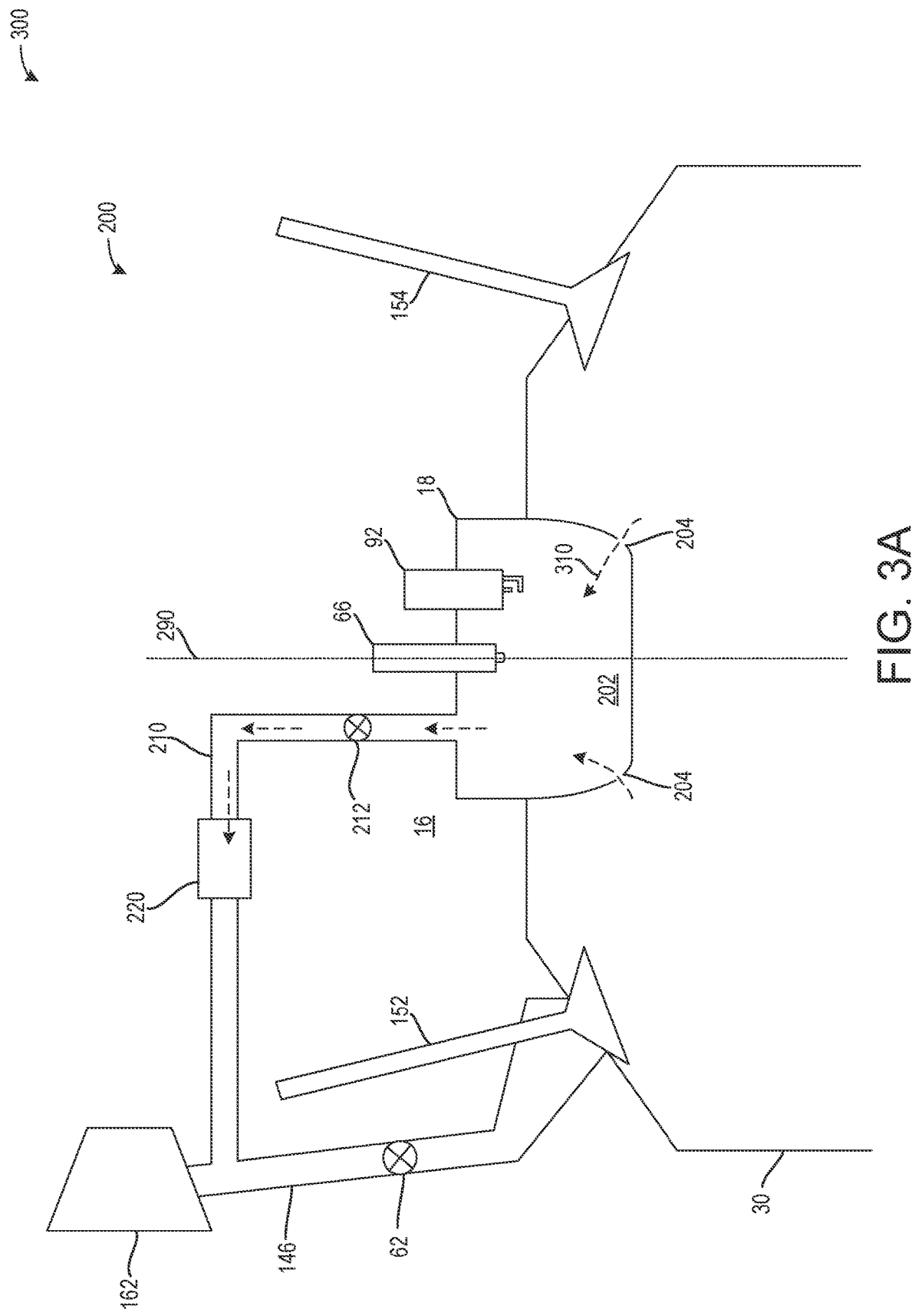
FIG. 3A illustrates an example gas flow through the prechamber during an exhaust stroke of a cold-start.
Figure 3B:
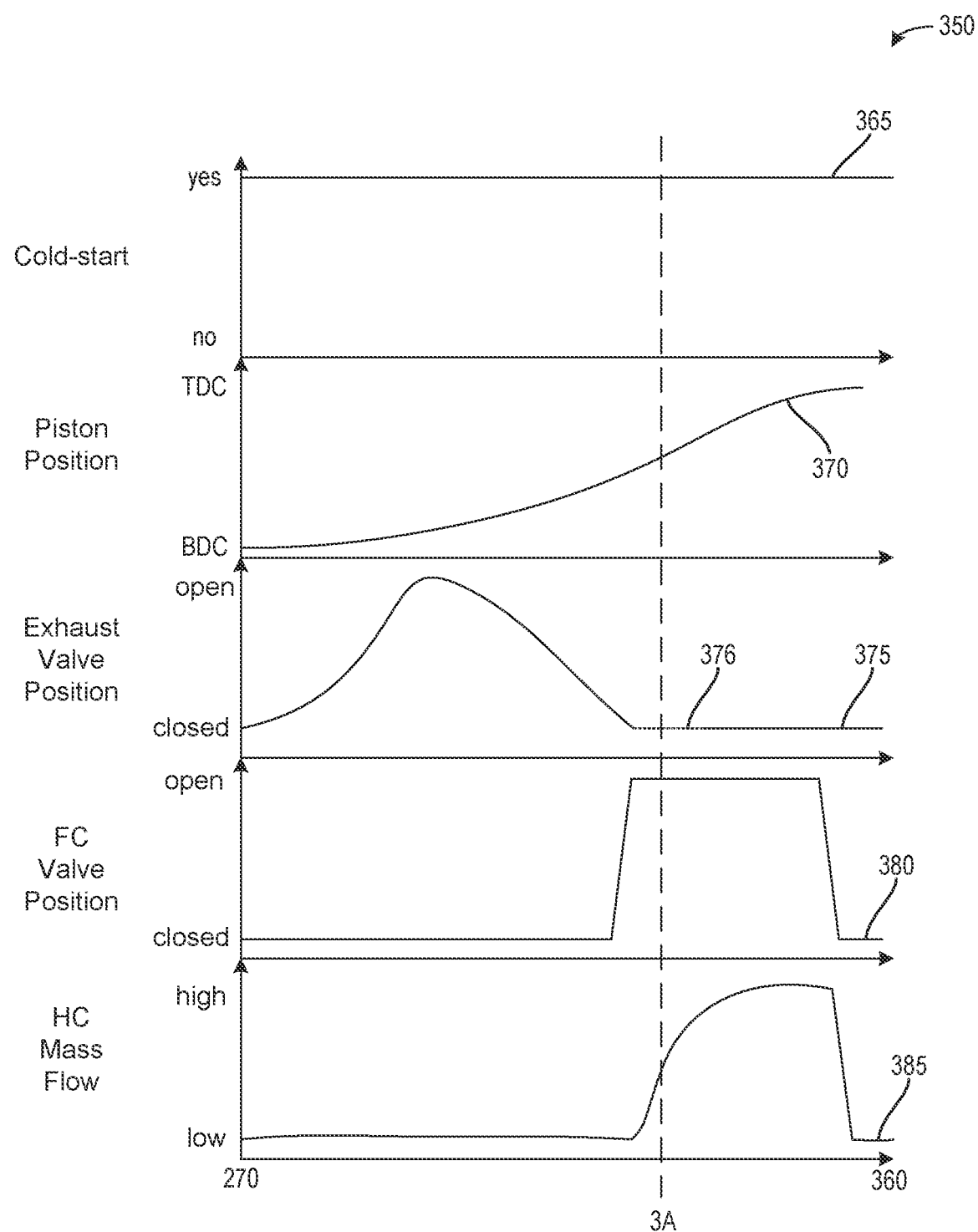
FIG. 3B illustrates an example timeline illustrating various conditions changing as a piston moves during a combustion cycle.
Figure 4A:
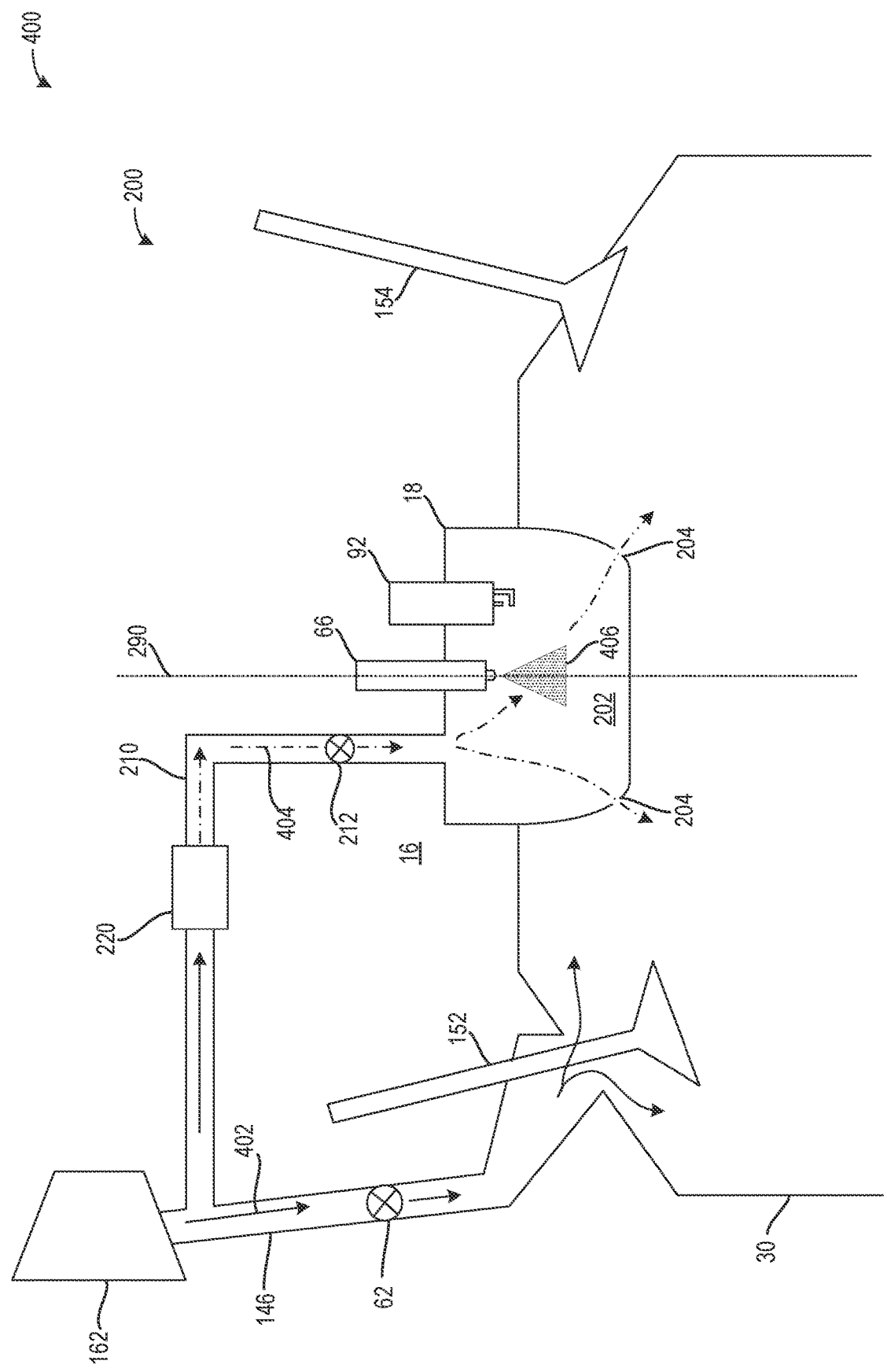
FIGS. 4A and 4B illustrate example gas flows through the prechamber during different stages of an intake stroke.
Figure 4B:
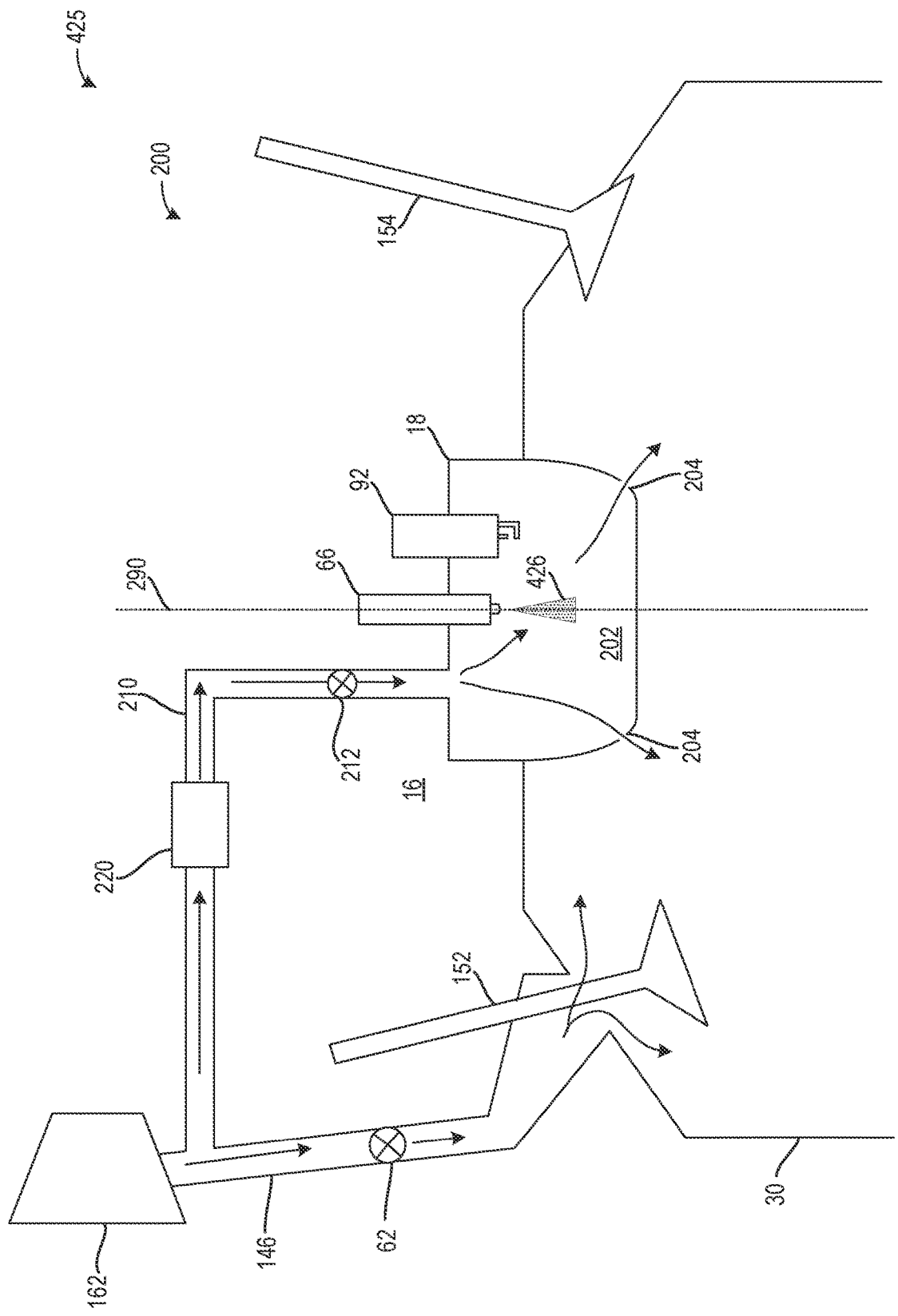
Figure 4C:
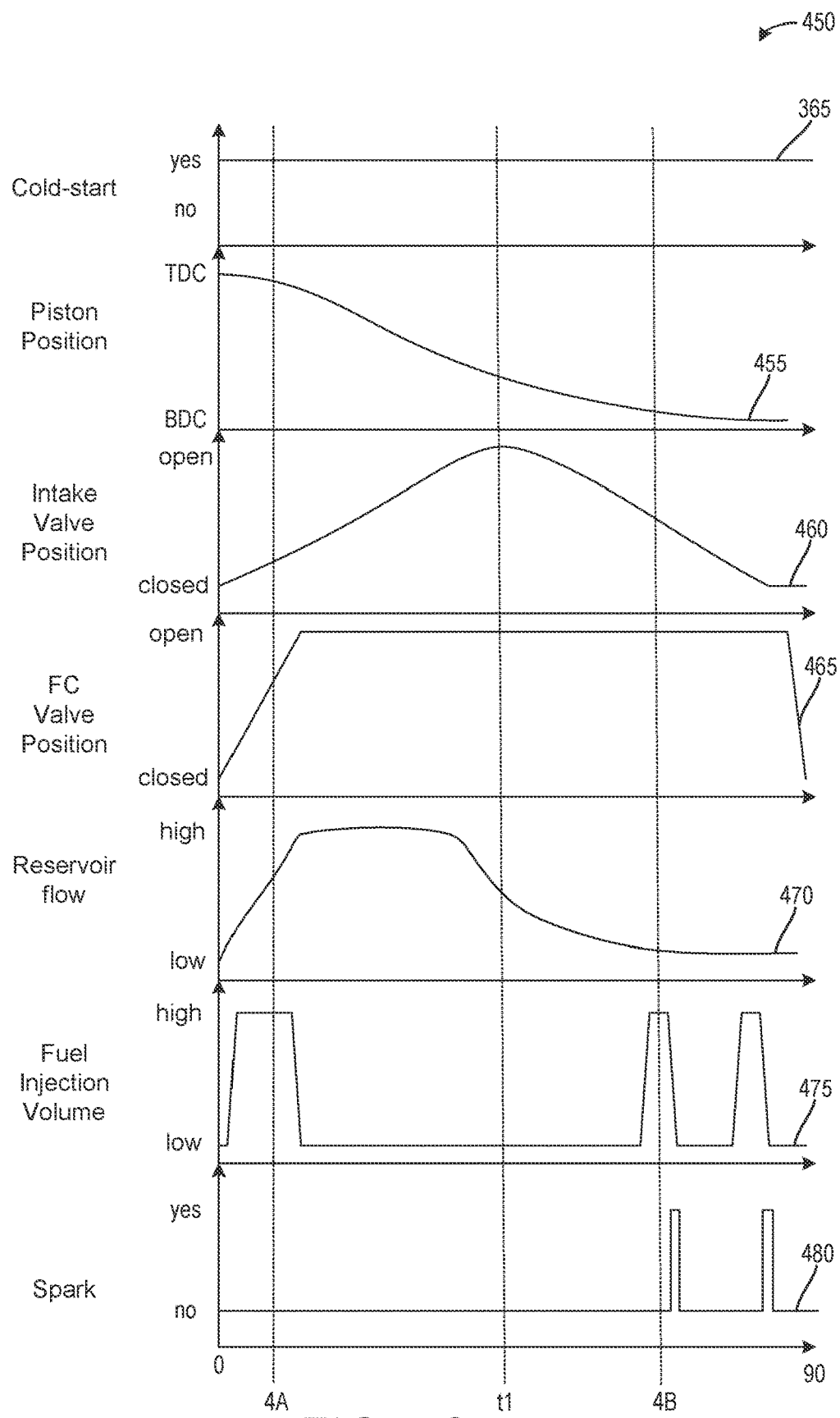
FIG. 4C illustrates an example timeline illustrating various conditions changing as the piston moves through the intake stroke of a combustion cycle.
Figure 5:
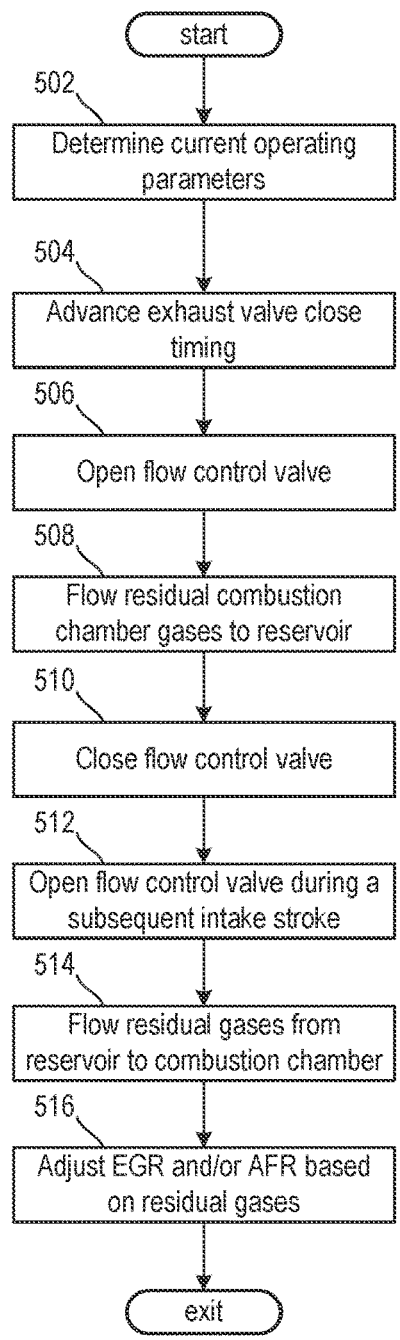
FIG. 5 illustrates a method for adjusting a flow control valve based on conditions.

An example operation of the prechamber and various components associated therewith during an exhaust stroke of a cold-start is illustrated in FIG. 3A. A timeline graphically illustrating the operation of FIG. 3A is illustrated in FIG. 3B An example operation of the prechamber and various components associated therewith during different segments of an intake stroke of a combustion cycle are illustrated in FIGS. 4A and 4B. A timeline graphically illustrating the operation of FIGS. 4A and 4B is illustrated in FIG. 4C. A method for operating a flow control valve along with parameters for an exhaust valve and a fuel injector is shown in FIG. 5.

FIGS. 1, 2, 3A, 4A, and 4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12. Engine 10 includes a cylinder block 14 including at least one cylinder bore 20 and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. The cylinder bore 20 may be defined as the volume enclosed by the cylinder walls 32. The cylinder head 16 may be coupled to the cylinder block 14, to enclose the cylinder bore 20. Thus, when coupled together, the cylinder head 16 and cylinder block 14 may form one or more combustion chambers. In particular, combustion chamber 30 may be the volume included between a top surface 17 of the piston 36 and a fire deck 19 of the cylinder head 16. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such may the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

A prechamber 18 is located within the cylinder head 16 of the combustion chamber 30. Specifically, the prechamber 18 is arranged within the cylinder head 16 and houses each of a fuel injector 66 and an ignition device 92. The prechamber 18 may extend into the combustion chamber 30 and fluidly couple thereto via a plurality of openings arranged in a body of the prechamber 18.

The cylinder walls 32, piston 36, and cylinder head 16 may thus form the combustion chamber 30, where a top surface 17 of the piston 36 serves as the bottom wall of the combustion chamber 30 while an opposed surface or fire deck 19 of the cylinder head 16 forms the top wall of the combustion chamber 30. Thus, the combustion chamber 30 may be the volume included within the top surface 17 of the piston 36, cylinder walls 32, and fire deck 19 of the cylinder head 16.

Fuel injector 66 may be positioned to inject fuel directly into an interior volume of the prechamber 18. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a diesel engine, and the fuel tank may include diesel fuel, which may be injected by injector 66 into the prechamber 18. However, in the example of FIG. 1, the engine 10 is a gasoline engine, with an ignition device 92 arranged within the prechamber 18 adjacent to the fuel injector 66.

Intake manifold 144 is shown communicating with optional electronic throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air. In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted air charge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Emission control device may be a catalytic converter and as such may also be referred to herein as catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example. While the depicted example shows UEGO sensor 126 upstream of turbine 164, it will be appreciated that in alternate embodiments, UEGO sensor may be positioned in the exhaust manifold downstream of turbine 164 and upstream of convertor 70.

During the combustion cycle, each cylinder within engine 10 may undergo a four stroke cycle including: an intake stroke, compression stroke, power stroke, and exhaust stroke. During the intake stroke and power stroke, the piston 36 moves away from the cylinder head 16 towards a bottom of the cylinder increasing the volume between the top of the piston 36 and the fire deck 19. The position at which piston 36 is near the bottom of the cylinder and at the end of its intake and/or power strokes (e.g., when combustion chamber 30 is at its largest volume) is typically referred to by those of skill in the art as bottom dead center (BDC). Conversely, during the compression and exhaust strokes, the piston 36 moves away from BDC towards a top of the cylinder (e.g., fire deck 19), thus decreasing the volume between the top of the piston 36 and the fire deck 19. The position at which piston 36 is near the top of the cylinder and at the end of its compression and/or exhaust strokes (e.g., when combustion chamber 30 is at its smallest volume) is typically referred to by those of skill in the art as top-dead center (TDC). Thus, during the intake and power strokes, the piston 36 moves from TDC to BDC, and during the compression and exhaust strokes, the piston 36 moves from BDC to TDC.

Further, during the intake stroke, generally, the exhaust valves 154 close and the intake valves 152 open to admit intake air into the combustion chamber 30. During the compression stroke, both valves 152 and 154 may remain closed, as the piston 36 compresses the gas mixture admitted during the intake stroke. During the compression stroke, gases in the combustion chamber 30 may be pushed into the prechamber 18 due to the positive pressure created by the piston 36 as it travels towards the prechamber 18. The gases from the combustion chamber 30 may dissipate heat through one or more of the cylinder head 16 and ambient air via conduction and/or convention. As such, the temperature of the gases in the prechamber 18 may be reduced relative to the temperature of the gases in the combustion chamber 30.

When the piston 36 is near or at TDC during the compression and/or power stroke, fuel is injected into the combustion chamber 30 by injector 66. During the ensuing power stroke, the valves 152 and 154 remain closed, as the expanding and combusting fuel and air mixture pushes the piston 36 towards BDC. In some examples, fuel may be injected prior to the piston 36 reaching TDC, during the compression stroke. However, in other examples, fuel may be injected when the piston 36 reaches TDC. In yet further examples, fuel may be injected after the piston 36 reaches TDC and begins to translate back towards BDC during the power stroke. In yet further examples, fuel may be injected during both the compression and power strokes.

Fuel may be injected over a duration. An amount of fuel injected and/or the duration over which fuel is injected may be varied via pulse width modulation (PWM) according to one or more linear or non-linear equations. Further, the injector 66 may include a plurality of injection orifices, and an amount of fuel injected out of each orifice may be varied as desired.

During the exhaust stroke, the exhaust valves 154 may open to release the combusted air-fuel mixture to exhaust manifold 148 and the piston 36 returns to TDC. Exhaust gases may continue to flow from the exhaust manifold 148, to the turbine 164 via exhaust passage 180.

Both the exhaust valves 154 and the intake valves 152 may be adjusted between respective closed first positions and open second positions. Further, the position of the valves 154 and 152 may be adjusted to any position between their respective first and second positions. In the closed first position of the intake valves 152, air and/or an air/fuel mixture does not flow between the intake manifold 144 and the combustion chamber 30. In the open second position of the intake valves 152, air and/or an air/fuel mixture flows between the intake manifold 144 and the combustion chamber 30. In the closed second position of the exhaust valves 154, air and/or an air fuel mixture does not flow between the combustion chamber 30 and the exhaust manifold 148. However, when the exhaust valves 154 is in the open second position, air and/or an air fuel mixture may flow between the combustion chamber 30 and the exhaust manifold 148.

Note that the above valve opening and closing schedule is described merely as an example, and that intake and exhaust valve opening and/or closing timings may vary, such as to provide positive or negative valve overlap, late intake valve closing, or various other examples.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In an aspect of the present description, Hell effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

In some examples, additionally or alternatively, the turbine 164 may be omitted and the compressor 162 may be configured as a supercharger driven via the battery 61. As such, the compressor 162 may be activated during conditions where exhaust gas is not generated.

Turning now to FIG. 2, it shows a prechamber system 200 of the combustion chamber 30 of FIG. 1. As such, components previous introduced may be similarly numbered in this figure and subsequent figures. A central axis of the combustion chamber 30 is illustrated via a dashed line 290. A piston of the combustion chamber 30 (e.g., piston 36 of FIG. 1) may be configured to oscillate along the central axis 290.

The prechamber 18 may be arranged in each of a cylinder head region 16 and within an interior volume of the combustion chamber 30. As illustrated, each of the ignition device 92 and the fuel injector 66 are arranged in a portion of prechamber 18 within the cylinder head 16. The prechamber 18 may be arranged between the intake valve 152 and the exhaust valve 154. The injector 66 is arranged between a passage 210 and the ignition device 92 and positioned to inject along the central axis 290. By arranging the injector 66 adjacent to the passage 210, mixing between gases flowing out of the passage 210 into the prechamber and a fuel injection therein may be enhanced.

The prechamber 18 further includes a plurality of openings 204. The plurality of opening 204 may fluidly couple an interior volume 202 to the combustion chamber 30. A fuel injection provided by the injector 66 may mix with combustion chamber gases that are forced into the interior volume (via motion of a piston) and ignite via a spark provided by the ignition device 92. In one example, the ignition device 92 is a spark plug. The combustion mixture may then flow into the combustion chamber 30 and propagate therein.

The passage 210 may be fluidly coupled to each of the boost chamber 146 and the interior volume 202 of the prechamber 18. The passage 210 may include a valve 212 configured to adjust a flow of gases between a reservoir 220 and the interior volume 202 of the prechamber 18. The valve 212 may be electrically, mechanically, pneumatically, or hydraulically actuated. In one example, an actuator of the valve 212 is configured to receive a signal from a controller (e.g., controller 12 of FIG. 1) to actuate the valve 212 to a fully closed position, a fully open position, or a position therebetween. Additionally or alternatively, the valve 212 may be configured to actuate to only the fully closed position or the fully open position. The fully open position may correspond to a position with maximum gas flow between the interior volume 202 of the prechamber 18 and the reservoir 220. The fully closed position may correspond to a position with no gas flow between the interior volume 202 of the prechamber 18 and the reservoir 220.

The interior volume 202 of the prechamber 18 may be a space separate from a volume of the combustion chamber 30. That is to say, walls of the prechamber 18 may fluidly separate the interior volume 202 from the volume of the combustion chamber 30. The plurality of openings 204 may be the only inlets and outlets fluidly coupling the interior volume 202 to the volume of the combustion chamber 30.

The reservoir 220 may be configured to store gases and fluids. The gases may be supplied from the compressor 162 and/or the combustion chamber 30. As such, the gases may include boost air, residual gases, and fuel vapors and fluids, which may include liquid fuel. In one example, the reservoir 220 may include an adsorbent or other material for trapping fuel vapors and gases. Additionally or alternatively, a valve may be arranged between the reservoir and the compressor 162 to block gases from leaving the reservoir 220 and flowing through the compressor 162 during compressor off conditions. Herein, residual gases are defined as exhaust gases remaining in the combustion chamber 30 following closure of the exhaust valve 154 during an exhaust stroke. The inventors have identified that a composition of the residual gases may differ from exhaust gases during certain conditions, such as during a cold-start.

The reservoir 220 may be a single reservoir, fluidly coupled to each prechamber of a plurality of cylinders of an engine. Additionally or alternatively, the reservoir 220 may be one reservoir of a plurality of reservoirs, wherein each reservoir of the plurality of reservoirs may be fluidly coupled to one prechamber of a corresponding cylinder of the engine.

As will be described herein, during some conditions, the valve 212 may be actuated to the fully open position from the fully closed position to allow gas flow between the reservoir 220 and the interior volume 202 of the prechamber 18. In the example of FIG. 3A, the valve 212 is opened during an exhaust stroke when an engine temperature is less than a threshold temperature. By doing this, unburned fuels, a majority of which may exit the combustion chamber during the end portion of the exhaust stroke, may instead be directed to the reservoir 220 via the open valve 212 and the exhaust valve 154 closing. As another example shown in FIGS. 4A and 4B, the valve 212 may be opened during at least a portion of an intake stroke. The compressor 162 may be active and boost air from the compressor 162 enters the reservoir and sweeps a contents therein into the interior volume 202 of the prechamber 18. By doing this, residual gases in the interior volume 202 of the prechamber 18 may be cleared therefrom.

Turning now to FIG. 3A, it shows an embodiment 300 of the prechamber system 200. The embodiment 300 includes where the valve 312 is fully open, thereby fluidly coupling the interior volume 202 of the prechamber 18 to the reservoir 220. In the example of FIG. 3A, a cold-start is occurring and the conditions illustrate a portion of an exhaust stroke. The configuration of the prechamber system 200 in the example of FIG. 3A includes where the exhaust valve 154 is in a premature, fully closed position such that gases (illustrated by arrows 310) from the combustion chamber 30 may flow through only the openings 204 of the prechamber 18, into the passage 210, through the open valve 212, and into the reservoir 220.

FIG. 3B illustrates a plot 350 graphically illustrating various conditions during an entire exhaust stroke of the cold-start of the example of FIG. 3A. Plot 365 illustrates if a cold-start is occurring. Plot 370 illustrates a piston position. Plot 375 illustrates an exhaust valve position. Plot 380 illustrates a flow control valve position. Herein, the valve 212 may be interchangeably referred to as the flow control valve. Plot 385 illustrates a hydrocarbon (HC) mass flow. A state of the combustion cycle is plotted along the abscissa. Crank angle is illustrated on the abscissa.

A cold-start is occurring (plot 365). As such, HC emissions may be relatively high. In one example, HC emissions from the combustion chamber 30 may be biased toward an end of the exhaust stroke. That is to say, more unburned HCs may be exhausted from the combustion chamber 30 near an end of the exhaust stroke compared to earlier segments which expel primarily exhaust gas. As the piston moves from BDC at a start of the exhaust stroke to TDC at an end of the exhaust stroke, the exhaust valve position may be moved to an open position during an early portion of the exhaust stroke. Dashed line 376 illustrates an advancing of the exhaust valve moving to a fully closed position relative to the exhaust valve close timing of previous examples or other engine conditions. In one example, the dashed line 376 illustrates an advancing of the exhaust valve closing during only the cold start. As such, the exhaust valve may be closed at a threshold timing illustrated via a continuation of solid line plot 375 following the dashed line 376. In one example, the advanced timing is 10 or more, or 20 or more, or 30 or more, or 50 or more crank angles before the threshold timing. In one example, the threshold timing is based on a timing where gases from the combustion chamber have been cleared. Thus, by advancing the timing of the closing of the exhaust valve, some amount of exhaust gases remains in the combustion chamber 30 (e.g., residual gases). In one example, the example of FIG. 3A illustrates a moment of the exhaust stroke corresponding to the advanced closing of the exhaust valve 154 (e.g., at dashed line 376).

The flow control valve is moved to an open position in conjunction with the exhaust valve moving to the closed position. By doing this, residual gases, in which HCs may be present, are directed to the reservoir, as illustrated by plot 385 illustrating a HC mass flow, by flowing through the openings 204, through the interior volume 202, through the passage 210, through the open flow control valve 212, and to the reservoir 220. The gases may be stored therein until combustion conditions are suitable for combusting the unburned HCs. In one example, combustion conditions may be suitable during a subsequent intake stroke during the cold-start. By doing this, cold-start emissions may be reduced.

Turning now to FIGS. 4A and 4B, they show a first segment 400 and a second segment 425 of an intake stroke of a combustion cycle of the combustion chamber 30, respectively. The first segment 400 may occur earlier than the second segment 425. A graphical representation of the examples of FIGS. 4A and 4B is illustrated in FIG. 4C. In one example, intake stroke segments of FIGS. 4A and 4B follow the exhaust stroke of FIG. 3A. However, it will be appreciated that operations illustrated in FIGS. 3A, 4A, and 4B may be executed outside of a cold-start, as will be described below with respect to FIG. 5.

The first segment 400 illustrates an early portion of an intake stroke, wherein a piston is closer to TDC than BDC, as illustrated in FIG. 4C. During the early portion, the compressor 162 is active and boost air is flowing, shown by arrows 402 to each of the combustion chamber 30 and the reservoir 220. Thus, the throttle valve 62 and the intake valve 152 are in open positions to allow boost air to flow directly into the combustion chamber 162.

Boost air flowing to the reservoir 220 may mix with residual gases stored therein. A mixture of the boost air and residual gases from the reservoir 220 may flow through the passage 210 and into the interior volume of the prechamber 18 via the flow control valve 212 being in an open position. The mixture is illustrated via arrows 404.

The injector 66 may be injecting a primary injection 406. In one example, a volume of the primary injection 406 is greater than a volume of secondary injections or other injections executed during the intake stroke. As such, a pulse-width provided to an actuator of the fuel injector 66 may be configured to hold an open position of the injector for an increased period of time or to reduce a closing time of the injector. The mixture may mix with the primary injection 406 within the interior volume 202 of the prechamber 18. The mixture and injection may then enter the combustion chamber 30 via the plurality of openings 204, wherein the mixture may further mix with boost air arranged therein.

In this way, unburned hydrocarbons from a cold-start may be stored in the reservoir 220 as residual gases for a period of time until combustion conditions are determined to be suitable for efficient consumption of the unburned hydrocarbons. In one example, conditions may be suitable during a subsequent intake stroke. Additionally or alternatively, the residual gases may be stored for a period of time, wherein the residual gases are directed to the prechamber during an intake stroke outside of a cold-start.

In some examples, additionally or alternatively, the residual gases from the reservoir 220 and flowing to the prechamber may be accounted for such that EGR flow to the combustion chamber is adjusted. That is to say, a mass of EGR flow may be adjusted in anticipation of the reservoir mixture being delivered to the combustion chamber. In one example, the mass of the EGR flow is reduced in response to the mixture flowing to the combustion chamber. Thus, it may be desired to track or estimate a volume of residual gases stored in the reservoir 220, wherein the tracking may be based on a duration of a cold-start, an amount of exhaust gas generated during the cold-start, an amount of fuel injected during the cold-start, and the like.

FIG. 4B illustrates the second segment 425 of the intake stroke. In one example, the second segment 425 follows the first segment 400. That is to say, the second segment 425 may occur toward an end stage of the intake stroke closer to BDC than TDC. The second segment 425 may differ from the first segment 400 in that the reservoir 220 is free of unburned HCs and a composition of gases flowing therethrough is primarily boost air (shown by arrows 402). The second segment 425 further differs from the first segment 400 wherein one or more secondary injections are injected. The secondary injection 426 may be smaller than the primary injection 406 of FIG. 4A, wherein the secondary injection 426 is injected to meet a desired fuel injection amount, the desired fuel injection amount is based on a combination of the primary and secondary injections. Combustion is initiated during the secondary injection 426, which includes the ignition device 92 providing a spark or the like. The combustion in the prechamber 18 may propagate through the combustion chamber 30 by igniting the primary fuel injection, boost air, residual gases, unburned hydrocarbons, and the like arranged therein.

FIG. 4C illustrates a graph 450 graphically illustrating the conditions of the intake stroke including the first segment 400 and the second segment 425. In the example of FIG. 4C, a cold-start occurring is a same cold-start as the cold-start occurring in FIG. 3B. Thus, plot 365 is used again to illustrate a cold-start condition. Plot 455 illustrates a piston position. Plot 460 illustrates an intake valve position. Plot 465 illustrates a flow control valve position. Plot 470 illustrates a reservoir flow. Plot 475 illustrates a fuel injection amount. In one example, the reservoir flow corresponds to a flow of gases stored in the reservoir. Thus, when the tank flow is low, such as during the second segment 425 illustrated in FIG. 4B, residual gases stored in the reservoir are low or no longer present, thereby resulting in a relatively low reservoir flow. However, boost air may still be flowing through the reservoir. Crank angle is tracked along the abscissa, where the crank angle increases from a left to a right of the figure.

The piston begins the intake stroke at TDC and moves toward BDC as the intake stroke progresses (plot 455) during the cold-start (plot 365). The intake valve position moves gradually from a fully closed position to a fully open position at t1 (plot 460). The fuel injection volume increases near TDC of the intake stroke, wherein the flow control valve position may begin at open in conjunction with a timing of the fuel injection volume. As such, high pressure gases from the reservoir may begin to flow to the combustion chamber prior to t1. Dashed line 4A illustrates a location of the graph 450 at which the first segment 400 of FIG. 4A occurs. In this way, unburned hydrocarbons from a previous combustion cycle may be combusted during a current combustion cycle.

After t1, the intake valve position begins to move to a less open position. Boost air may still flow through the intake port and into the combustion chamber. The flow control valve remains open, however, reservoir flow may be reduced following t1 due to a majority of the volume of the residual gases therein being expelled prior to t1. Thus, gases flowing therethrough may be primarily boost air. Secondary fuel injections occur prior to t1. In the example of FIG. 4C, a volume of the secondary fuel injections is substantially identical. However, it will be appreciated that the volume of the secondary fuel injections may differ from one another while still being less than the primary injection prior to t1. The secondary injections may be accompanied by a spark (plot 480). In one example, a spark is initiated with each of the secondary injections. Additionally or alternatively, a spark may be initiated with only one of the secondary injections.

The flow control valve is moved toward a fully closed position in response to the intake valve moving to a fully closed position near BDC of the intake stroke. In this way, the combustion chamber is sealed and combustion may progress without flowing into the boost chamber or the passage 210.

Turning now to FIG. 5, it shows a method 500 for operating the valve in response to one or more conditions of a combustion cycle. The method 500 may be executed during a cold-start or outside of a cold-start without departing from the scope of the present disclosure. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 500 may be used during or outside of a cold-start. For example, the method 500 may be used to trap and store emissions during a cold-start to be reintroduced to combustion conditions. Additionally or alternatively, the method 500 may be used to store boost air in the reservoir, where the stored boost air may be used to clear residual gases from a prechamber.

The method 500 begins at 502, which includes determining current operating parameters. Current operating parameters may include but are not limited to one or more of a throttle position, a manifold pressure, an engine temperature, an engine speed, a vehicle speed, and an air/fuel ratio.

The method 500 may proceed to 504, which includes advancing an exhaust valve close timing. Advancing the exhaust valve close timing may be relative to a desired exhaust valve close timing, wherein the desired exhaust valve close timing is based on a threshold amount of exhaust gas being expelled from the combustion chamber. In one example, the threshold amount of exhaust gas is based on a volume of 90% or greater of the exhaust gas in the combustion chamber being forced through the exhaust valve. An amount of advancing may be based on one or more of the engine temperature, an amount of fuel injected, and the like. For example, if the engine temperature is less than a threshold temperature (e.g., an ambient temperature or a cold-start temperature), then the advancing may be increased such that the exhaust valve expels less exhaust gas and flows more residual gas to the reservoir.

The method 500 may proceed to 506, which includes opening a flow control valve. As such, the passage may be fluidly coupled to an interior volume of the prechamber.

The method 500 may proceed to 508, which includes flowing residual combustion chamber gases to the reservoir. The reservoir may store the combustion chamber gases until a subsequent intake stroke. In one example, the compressor is active during this step, wherein operation of the compressor may block the residual gases from flowing thereto. The compressor may be providing boost air to other cylinders undergoing an intake stroke.

The method 500 may proceed to 510, which includes closing the flow control valve. The flow control valve may be closed near an end of the exhaust stroke.

The method 500 may proceed to 512, which includes opening the flow control valve during a subsequent intake stroke. The subsequent intake stroke may include an intake stroke following the exhaust stroke within the same combustion chamber.

The method 500 may proceed to 514, which includes flowing residual gases from the reservoir to the combustion chamber. The residual gases may be rich in unburned hydrocarbons if the engine is undergoing a cold-start.

The method 500 may proceed to 516, which includes adjusting one or more of an EGR flow rate and an air/fuel ratio based on the residual gases. For example, if the residual gases are directed to the combustion chamber during a cold-start, then an injection volume of a primary injection or of a secondary injection may be reduced based on an amount of unburned fuel in the residual gases. Additionally, an amount of air directed to the combustion chamber may be reduced based on an amount of air in the residual gas. In some examples, additionally or alternatively, if the cold-start is not occurring and the residual gas is flowing to the combustion chamber from the reservoir, then an exhaust gas recirculation (EGR) flow rate may be reduced based on an amount of gas flowing from the reservoir to the combustion chamber.

In some examples, the method 500 may omit the step of advancing the exhaust valve closing timing. Such conditions may include higher engine loads or the like. The process of the method 500 may remain the same where residual gases from the combustion chamber and boost air from the compressor are stored in the reservoir and used during a future combustion cycle.

In this way, an engine system may include an active prechamber configured to execute combustion therein. A reservoir may be optionally coupled to an interior volume of the prechamber based on a position of a valve. The reservoir may store residual gases from a previous combustion cycle and flow the residual gases to the combustion chamber during an intake stroke of a current combustion cycle. The technical effect of the reservoir is to clear residual gases from the prechamber, thereby enhancing combustion conditions. The reservoir may be further configured to store unburned HCs in the residual gases to be more efficiently combusted during a future combustion cycle. A further technical effect of the engine system is to decrease a packaging size of the prechamber and reservoir by fluidly coupling the reservoir to a compressor instead of an auxiliary pump.

An embodiment of a system comprises a reservoir fluidly coupled to each of a compressor and a prechamber. A first example of the system further includes where the reservoir is arranged in a passage, and wherein a valve is arranged between the reservoir and an interior volume of the prechamber. A second example of the system, optionally including the first example, further includes where the prechamber is an active prechamber comprising an injector and an ignition device. A third example of the system, optionally including one or more of the previous examples, further includes where the compressor is mechanically coupled to a turbine. A fourth example of the system, optionally including one or more of the previous examples, further includes where the compressor is electrically driven.

An embodiment of an engine system comprises a reservoir fluidly coupled to each of a compressor and a prechamber, and a controller with computer-readable instructions that when executed enable the controller to advance a closing of an exhaust valve of an engine, and open a flow control valve arranged in a passage between the reservoir and the prechamber. A first example of the engine system further includes where the instructions further enable the controller to close the flow control valve as a piston approaches top-dead center of an exhaust stroke. A second example of the engine system, optionally including the first example, further includes where the instructions further enable the controller to open the flow control valve during an intake stroke of the piston. A third example of the engine system, optionally including one or more of the previous examples, further includes where the flow control valve is maintained open through a primary injection and one or more secondary injections during the intake stroke. A fourth example of the engine system, optionally including one or more of the previous examples, further includes where the reservoir is configured to store gases and liquids from the prechamber and the compressor. A fifth example of the engine system, optionally including one or more of the previous examples, further includes where the engine includes a plurality of cylinders, each cylinder of the plurality of cylinders including the prechamber. A sixth example of the engine system, optionally including one or more of the previous examples, further includes where the reservoir is a single reservoir fluidly coupled to each prechamber of the plurality of cylinders. A seventh example of the engine system, optionally including one or more of the previous examples, further includes where the reservoir is one reservoir of a plurality of reservoirs, each reservoir of the plurality of reservoirs is fluidly coupled to corresponding prechambers of the plurality of cylinders. An eighth example of the engine system, optionally including one or more of the previous examples, further includes where the closing of the exhaust valve is advanced during and outside of a cold-start of the engine. A ninth example of the engine system, optionally including one or more of the previous examples, further includes where the closing of the exhaust valve is advanced by 20 to 50 crank angles.

An embodiment for a method for an engine system comprising a reservoir fluidly coupled to a compressor and a prechamber, the method comprises advancing a closing of an exhaust valve by a threshold crank angle and flowing residual gases from a combustion chamber to the reservoir. A first example of the method further includes opening a valve arranged in a passage, wherein the reservoir is arranged in the passage, and wherein the valve is arranged between the reservoir and an interior volume of the prechamber. A second example of the method, optionally including the first example, further includes flowing residual gases from the reservoir to the prechamber during an intake stroke. A third example of the method, optionally including one or more of the previous examples, further includes where flowing residual gases from the reservoir to the prechamber comprises a fuel injector injecting fuel into the prechamber. A fourth example of the method, optionally including one or more of the previous examples, further includes where storing residual gases or boost gases in the reservoir.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a reservoir fluidly coupled to each of a compressor and a prechamber,
wherein the reservoir is configured to receive and store gases and liquids from the prechamber.

2. The system of claim 1, wherein the reservoir is arranged in a passage, and wherein a valve is arranged between the reservoir and an interior volume of the prechamber.

3. The system of claim 1, wherein the prechamber is an active prechamber comprising an injector and an ignition device.

4. The system of claim 1, wherein the compressor is mechanically coupled to a turbine.

5. The system of claim 1, wherein the compressor is electrically driven.

6. An engine system, comprising:
a reservoir fluidly coupled to each of a compressor and a prechamber; and
a controller with computer-readable instructions that when executed enable the controller to:
advance a closing of an exhaust valve of an engine; and
open a flow control valve arranged in a passage between the reservoir and the prechamber.

7. The engine system of claim 6, wherein the instructions further enable the controller to close the flow control valve as a piston approaches top-dead center of an exhaust stroke.

8. The engine system of claim 7, wherein the instructions further enable the controller to open the flow control valve during an intake stroke of the piston.

9. The engine system of claim 8, wherein the flow control valve is maintained open through a primary injection and one or more secondary injections during the intake stroke.

10. The engine system of claim 6, wherein the reservoir is configured to store gases and liquids from the prechamber and the compressor.

11. The engine system of claim 6, wherein the engine includes a plurality of cylinders, each cylinder of the plurality of cylinders including the prechamber.

12. The engine system of claim 11, wherein the reservoir is a single reservoir fluidly coupled to each prechamber of the plurality of cylinders.

13. The engine system of claim 11, wherein the reservoir is one reservoir of a plurality of reservoirs, each reservoir of the plurality of reservoirs is fluidly coupled to corresponding prechambers of the plurality of cylinders.

14. The engine system of claim 6, wherein the closing of the exhaust valve is advanced during and outside of a cold-start of the engine.

15. The engine system of claim 6, wherein the closing of the exhaust valve is advanced by 20 to 50 crank angles.

16. A method for an engine system comprising a reservoir fluidly coupled to a compressor and a prechamber, the method, comprising:
advancing a closing of an exhaust valve by a threshold crank angle; and
flowing residual gases from a combustion chamber to the reservoir.

17. The method of claim 16, further comprising opening a valve arranged in a passage, wherein the reservoir is arranged in the passage, and wherein the valve is arranged between the reservoir and an interior volume of the prechamber.

18. The method of claim 16, further comprising flowing residual gases from the reservoir to the prechamber during an intake stroke.

19. The method of claim 18, further comprising where flowing residual gases from the reservoir to the prechamber comprises a fuel injector injecting fuel into the prechamber.

20. The method of claim 16, further comprising storing residual gases or boost gases in the reservoir.

\* \* \* \* \*